(12) United States Patent
Diamond et al.

(10) Patent No.: US 12,415,546 B2
(45) Date of Patent: Sep. 16, 2025

(54) ROCK KICK UP RECOGNITION SYSTEM

(71) Applicant: FORD GLOBAL TECHNOLOGIES, LLC, Dearborn, MI (US)

(72) Inventors: Brendan F. Diamond, Grosse Pointe, MI (US); Anthony Maraldo, Southgate, MI (US); Keith Weston, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 141 days.

(21) Appl. No.: 18/505,515

(22) Filed: Nov. 9, 2023

(65) Prior Publication Data

US 2025/0153737 A1    May 15, 2025

(51) Int. Cl.
  *B60W 60/00*    (2020.01)
  *B60Q 9/00*    (2006.01)
  *B60W 30/18*    (2012.01)
  *B62D 65/16*    (2006.01)

(52) U.S. Cl.
  CPC .......... *B60W 60/0016* (2020.02); *B60Q 9/00* (2013.01); *B60W 30/18163* (2013.01); *B60W 30/18172* (2013.01); *B60W 2420/54* (2013.01); *B60W 2552/10* (2020.02); *B60W 2554/802* (2020.02); *B60W 2556/65* (2020.02); *B60W 2720/10* (2013.01); *B60W 2754/30* (2020.02); *B62D 65/16* (2013.01)

(58) Field of Classification Search
  CPC ....... B60W 60/0016; B60W 30/18163; B60W 30/18172; B60W 10/30; B60W 2420/54; B60W 2552/10; B60W 2554/802; B60W 2556/65; B60W 2720/10; B60W 2754/30; B60Q 9/00; B62D 65/16
  See application file for complete search history.

(56) References Cited

U.S. PATENT DOCUMENTS

| 6,260,935 B1 | 7/2001 | Abe et al. |
| 8,989,963 B1 * | 3/2015 | Yellambalase ....... B60G 17/052 280/5.514 |
| 2023/0083999 A1 | 3/2023 | Marlett et al. |

FOREIGN PATENT DOCUMENTS

KR    19980029563 A    7/1998

* cited by examiner

*Primary Examiner* — Ashley L Redhead, Jr.
(74) *Attorney, Agent, or Firm* — Joseph Zane; Brooks Kushman P.C.

(57) ABSTRACT

A vehicle includes one or more sensors configured to generate sensor data; and a controller programmed to: responsive to receiving the sensor data indicative of rocks being propelled off the ground, perform a vehicle operation to protect the vehicle from the propelled rocks.

20 Claims, 2 Drawing Sheets

ROCK KICK UP RECOGNITION SYSTEM

TECHNICAL FIELD

The present disclosure generally relates to a vehicle system. More specifically, the present disclosure relates to a vehicle system for detecting rock kickups and performing operations accordingly.

BACKGROUND

Small rocks and gravel may be found on many roads, especially in rural areas and near construction sites. When vehicles drive on these roads, the rocks kicked up by the vehicles may hit other vehicles nearby causing paint chips, windshield cracks or the like. This issue may be particularly applicable when a trailing vehicle (e.g., rear vehicle) follows a leading vehicle (e.g., front vehicle) too closely as the rocks kicked up by tires of the leading vehicle may directly hit the trailing vehicle.

SUMMARY

In one or more exemplary embodiments of the present disclosure, a vehicle includes one or more sensors configured to generate sensor data; and a controller programmed to: responsive to receiving the sensor data indicative of rocks being propelled off the ground, perform a vehicle operation to protect the vehicle from the propelled rocks.

In one or more exemplary embodiments of the present disclosure, a method for a vehicle includes responsive to detecting a leading automobile driving ahead of the vehicle at a first distance is propelling rocks by tires, outputting a recommendation to a vehicle user to increase the first distance to protect the vehicle from the propelled rocks.

In one or more exemplary embodiments of the present disclosure, a non-transitory computer-readable medium includes instruction, when executed by one or more controllers of a vehicle, cause the vehicle to: detect, via one or more sensors, presence of rocks on a route to be traversed by the vehicle, wherein the rocks are associated with a density above a threshold indicative of an increased likelihood of being propelled by tires of the vehicle; and in response to the presence, perform a vehicle operation to protect the vehicle from the rocks, the vehicle operation including reducing a speed of the vehicle.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

Rocks can be kicked up or propelled by vehicle tires due to a combination of centrifugal force and frictional force. When a vehicle drives over rocks on tires, the frictional force and centrifugal force from the tires act on the rocks. The rotation of the tires speeds up the rocks and propels the rock from the ground in a motion having both a horizontal velocity and a vertical velocity. This is referred to herein as the rocks being kicked up. When the vehicle is driving forward (i.e. in most cases), rocks are usually kicked up backwards with respect to the direction of vehicle travel.

The present disclosure, among other things, proposes a vehicle system for detecting a road condition and performing operations accordingly. More specifically, the present disclosure proposes a vehicle system for detecting rock kickups and performing a driving maneuver and/or vehicle body operation (e.g. adjusting vehicle lighting) in response.

Figure 1:
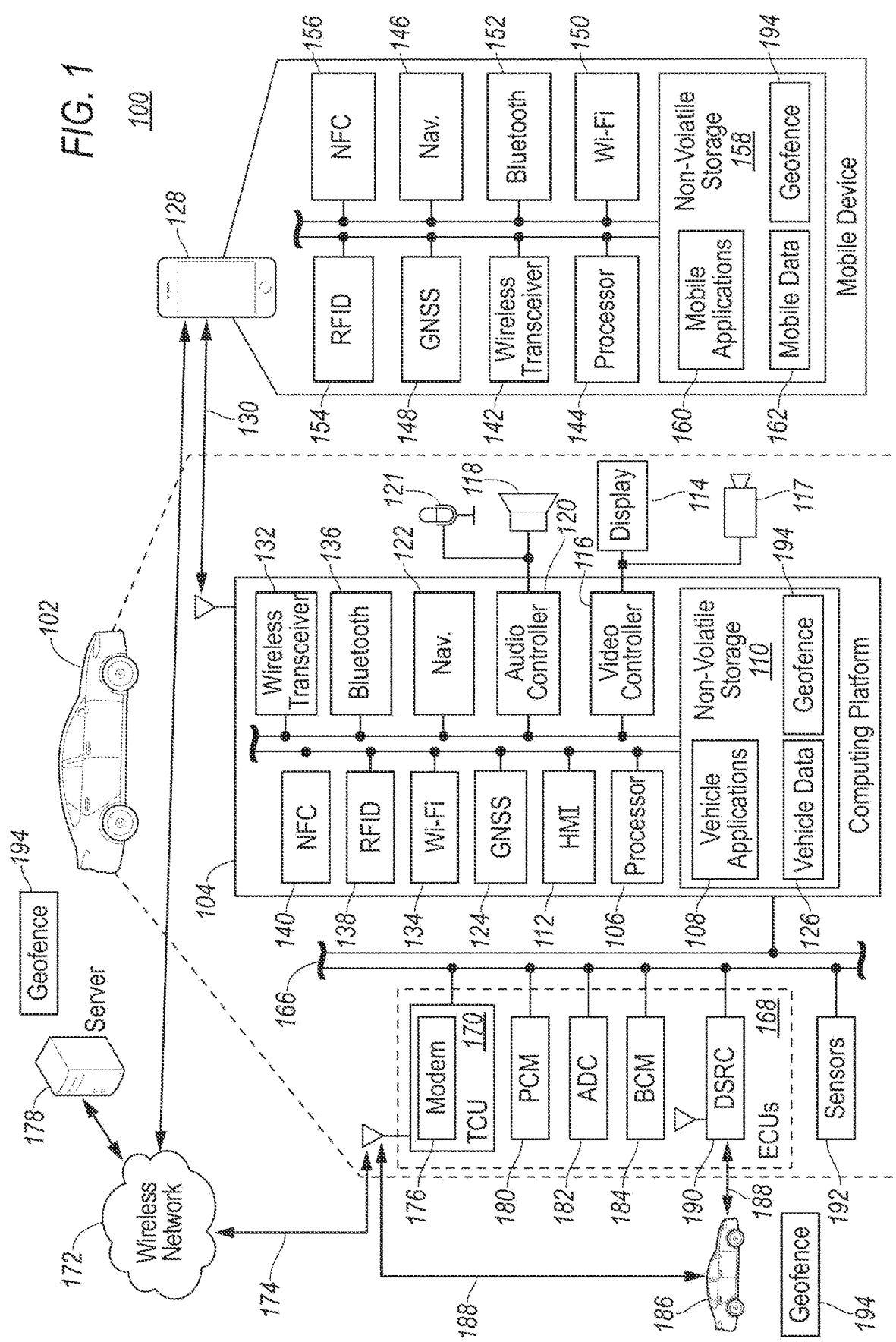
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), or other mobile machine for transporting people or goods. In many cases, the vehicle 102 may be powered by an internal combustion engine. As another possibility, the vehicle 102 may be a battery electric vehicle (BEV), a hybrid electric vehicle (HEV) powered by both an internal combustion engine and one or more electric motors, such as a series hybrid electric vehicle (SHEV), a plug-in hybrid electric vehicle (PHEV), or a parallel/series hybrid vehicle (PSHEV), or other mobile machine for transporting people or goods. It should be noted that the illustrated system 100 is merely an example, and more, fewer, and/or differently located elements may be used.

As illustrated in FIG. 1, a computing platform 104 may include one or more processors 106 configured to perform instructions, commands, and other routines in support of the processes described herein. For instance, the computing platform 104 may be configured to execute instructions of vehicle applications 108 to provide features such as navigation, data processing, and wireless communications. Such instructions and other data may be maintained in a non-volatile manner using a variety of types of computer-readable storage medium 110. The computer-readable medium 110 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and structured query language (SQL).

The computing platform 104 may be provided with various features allowing the vehicle occupants/users to interface with the computing platform 104. For example, the computing platform 104 may receive input from human machine interface (HMI) controls 112 configured to provide for occupant interaction with the vehicle 102. As an example, the computing platform 104 may interface with one or more buttons, switches, knobs, or other HMI controls configured to invoke functions on the computing platform 104 (e.g., steering wheel audio buttons, a push-to-talk button, instrument panel controls, etc.).

The computing platform 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 114 may be a display only, without touch input capabilities. The computing platform 104 may also drive or otherwise communicate with one or more cameras 117 to provide video input by way of the video controller 116. For example, the cameras 117 may include a dashcam 117 facing forward and configured to capture images in front of the vehicle 102. The cameras 117 may further include one or more parking cameras 117 configured to capture images within a vicinity of the vehicle 102 in various directions. Depending on the specific configurations and design needs, the cameras 117 (as well as other sensors to be discussed below) may be configured to capture images and/or detect objects at a predefined distance from a few meters range up to a few hundred meters range. This range may define the vicinity of the vehicle 102 as discussed herein. The parking cameras 117 may be configured to provide a 360° surrounding view using images captured by various lenses at different locations of the vehicle. For instance, the 360° surrounding view cameras 117 may include a front camera mounted on a vehicle grill, a rear camera mounted on a vehicle trunk/hatch, one or more side cameras mounted on side mirrors or B-pillars to capture images of the surrounding of the vehicle 102 at different angles. The images may be provided to the computing platform 104 for processing to produce a single surrounding view image. Videos and images collected by the various cameras 117 may be processed and analyzed by the computing platform 104 for rock kickup detections.

The computing platform 104 may also drive or otherwise communicate with one or more speakers 118 configured to provide audio output to vehicle occupants by way of an audio controller 120. The computing platform 104 may also drive or otherwise communicate with a microphone 121 configured to provide audio input by way of the audio controller 120. The microphone 121 may include an interior microphone 121 located within the vehicle cabin and configured to capture sound within the vehicle cabin. Additionally or alternatively, the microphone 121 may further include an exterior microphone 121 located outside the vehicle cabin (e.g. attached to the vehicle body) and configured to measure exterior sounds and noise. The interior and/or exterior sound measured by the microphones 121 may be processed by the computing platform 104 for rock kickup detections.

The computing platform 104 may also be provided with navigation and route planning features through a navigation controller 122 configured to calculate navigation routes responsive to user input via e.g., the HMI controls 112, and output planned routes and instructions via the speaker 118 and the display 114. Location data that is needed for navigation may be collected from a global navigation satellite system (GNSS) controller 124 configured to communicate with multiple satellites and calculate the location of the vehicle 102. The GNSS controller 124 may be configured to support various current and/or future global or regional location systems such as global positioning system (GPS), Galileo, Beidou, Global Navigation Satellite System (GLONASS) and the like. Map data used for route planning may be stored in the storage 110 as a part of the vehicle data 126. Navigation software may be stored in the storage 110 as one the vehicle applications 108.

The computing platform 104 may be configured to wirelessly communicate with a mobile device 128 of the vehicle users/occupants via a wireless connection 130. The mobile device 128 may be any of various types of portable computing devices, such as cellular phones, tablet computers, wearable devices, smart watches, smart fobs, laptop computers, portable music players, or other device capable of communication with the computing platform 104. A wireless transceiver 132 may be in communication with a Wi-Fi controller 134, a Bluetooth controller 136, a radio-frequency identification (RFID) controller 138, a near-field communication (NFC) controller 140, and other controllers such as a Zigbee transceiver, an IrDA transceiver, an ultra wide-band (UWB) controller (not shown), and configured to communicate with a compatible wireless transceiver 142 of the mobile device 128.

The mobile device 128 may be provided with a processor 144 configured to perform instructions, commands, and other routines in support of the processes such as navigation, telephone, wireless communication, and multi-media processing. For instance, the mobile device 128 may be provided with location and navigation functions via a navigation controller 146 and a GNSS controller 148. The mobile device 128 may be provided with a wireless transceiver 142 in communication with a Wi-Fi controller 150, a Bluetooth controller 152, a RFID controller 154, an NFC controller 156, and other controllers (not shown), configured to communicate with the wireless transceiver 132 of the computing platform 104. The mobile device 128 may be further provided with a non-volatile storage 158 to store various mobile application 160 and mobile data 162.

The computing platform 104 may be further configured to communicate with various components of the vehicle 102 via one or more in-vehicle network 166. The in-vehicle network 166 may include, but is not limited to, one or more of a controller area network (CAN), an Ethernet network, and a media-oriented system transport (MOST), as some examples. Furthermore, the in-vehicle network 166, or portions of the in-vehicle network 166, may be a wireless network accomplished via Bluetooth low-energy (BLE), Wi-Fi, UWB, or the like.

The computing platform 104 may be configured to communicate with various electronic control units (ECUs) 168 of the vehicle 102 configured to perform various operations.

For instance, the computing platform 104 may be configured to communicate with a telematics control unit (TCU) 170 configured to control telecommunication between the vehicle 102 and a wireless network 172 through a wireless connection 174 using a modem 176. The wireless connection 174 may be in the form of various communication network e.g., a cellular network. Through the wireless network 172, the vehicle may access one or more servers 178 to access various content for various purposes. It is noted that the terms wireless network and server are used as general terms in the present disclosure and may include any computing network involving carriers, router, computers, controllers, circuitry or the like configured to store data and perform data processing functions and facilitate communication between various entities.

The ECUs 168 may further include a powertrain control module (PCM) 180 configured to operate the powertrain of the vehicle 102. For instance, the PCM 180 may be configured to switch between various driving modes including an economic mode as associated with a more stringent traction control in which no wheel slip is allowed, and a performance mode associated with a more relaxed traction control in which the certain amount of wheel slip is allowed.

The ECUs 168 may further include an autonomous driving controller (ADC) 182 configured to control an autonomous driving feature of the vehicle 102. Driving instructions may be received remotely from the server 178. The ADC 182 may be configured to perform the autonomous driving features using the driving instructions combined with navigation instructions from the navigation controller 122.

The ECUs 168 may further include a body control module (BCM) 184 configured to control body operations of the vehicle 102. For instance, the BCM 184 may control the vehicle lighting and window operations based on user commands as well sensor inputs.

The vehicle 102 may be further configured to wirelessly communicate with one or more fleet vehicles 186 (a.k.a. fleet automobile) via the TCU 170. As an example, the TCU 170 may be configured to support the cellular vehicle-to-everything (CV2X) protocol and communicate with the fleet vehicle 186 via a vehicle-to-vehicle (V2V) connection 188. Additionally or alternatively, the vehicle 102 may be provided with a dedicated short-range communications (DSRC) controller 190 to establish the V2V connection 188 with the fleet vehicle 186 in addition to or in lieu of CV2X protocols. In the present disclosure, the fleet vehicle 186 may refer to any vehicle configured to support the wireless communication (e.g. the V2V connection 188) with the vehicle 102 using one or more wireless protocols described or not described herein.

The vehicle 102 may be further provided with various sensors 192 configured to perform measurements and generate sensor data inputs to the computing platform 104 and/or ECUs 168. For instance, the sensors 192 may include a lidar sensor, an ultrasonic sensor, and/or a radar sensor configured to detect objects within the vicinity of the vehicle 102. For instance, the vehicle 102 may detect a presence of the fleet vehicle 186 operating within the vicinity of the vehicle 102 via the sensors 192. Although discussed separately, the camera 117 and the microphone 121 may also be described as parts of the sensors 192 in the present disclosure. Thus, the sensor data may include data received from one or more of the sensors 192, as well as data received from the camera 117 and the microphone 121.

As discussed above, the present disclosure proposes a vehicle system 100 for detecting rock kickups and performing driving maneuvers and/or vehicle body operations in response. The vehicle 102 may detect the rocks kicked up by the tires of the fleet vehicle 186 via the sensors 192. In some cases, the vehicle 102 may also kick up rocks by its own tires when operating on an unpaved road. Although the rocks kicked up by the own tires are less likely to directly hit paint and windshield of the vehicle 102, the rocks may hit the undercarriage of the vehicle 102 and/or a trailing vehicle driving behind which are still undesirable. The sensors 192 may be further configured to detect the self-rock kickups (e.g. rear sensors detecting rocks flying behind the vehicle 102).

Additionally or alternatively, the microphone 121 may be used to detect the rock kickups in addition to or in lieu of the sensors 192. More specifically, the microphone 121 may be configured to detect the rock kickups by both the fleet vehicle 186 driving nearby (e.g. a leading vehicle/automobile driving ahead) and by the vehicle 102 itself using the sound caused by the rocking hitting vehicle 102. When the rocks hit the body of the vehicle 102, a sound may be generated and captured by the microphone 121. Depending on the frequency and characteristics of the sound, the computing platform 104 may estimate and determine which part of the vehicle body are hit by the rocks. For instance, if the vehicle 102 is trailing behind the fleet vehicle 186 and rocks kicked up by the fleet vehicle 186 continuously hit the vehicle 102 on the front bumper (e.g. mostly made of plastic) and windshield (e.g. made of glass), the noise detected by the microphone 121 may be associated with a lower pitch having a lower vibrating frequency. In comparison, rocks kicked up by the own tires of the vehicle 102 hitting the chassis (e.g. mostly made of metal) may be associated with a higher pitch having a higher vibrating frequency. By processing and differentiating the sound, the computing platform 104 may determine the source of the rock kick ups and perform operations accordingly. (To be discussed in detail below.) In addition, the sound captured by the microphone 121 may be further used to estimate and determine the size of rocks. Larger rocks hitting the vehicle body may be associated with a lower pitch compared to smaller rocks hitting the vehicle body. Similarly, the computing platform 104 may use other characteristics of the sound (e.g. sound density-quantity per time unit) to determine/estimate the vehicle location where the rocks are hit and/or the size of the rock. Machine learnings may be utilized by the computing platform 104 for the data processing and analysis.

Additionally or alternatively, the vehicle cameras 117 (exterior camera in particular) may capture images of the rock kick ups. Continuing with the above fleet vehicle 186 example, a front camera 117 of the vehicle 102 may capture images of rocks kicked up by the tires of the fleet vehicle 186 driving in the front. A side camera 117 (e.g. attached to the mirror or B-pillar) may capture images of rocks kicked up the own tires of the vehicle 102. The images captured by the cameras 117 may be further processed to determine the size of the rocks.

Areas where the rock kick ups occur as detected by the vehicle 102 and/or the fleet vehicle 186 may be classified into a geofence 194 stored in the vehicle storage 110 and shared across various entities. The geofence 194 may be indicative of one or more geographical areas (e.g. in coordinates) where the rock kickups have been detected by one or more reporting entities such as the vehicle 102 and the fleet vehicle 186. For instance, responsive to detecting rock kickups on a road section defined between a starting location and an ending location, the computing platform 104 may create the geofence 194 using the road section and report the geofence 194 to the server 178. The geofence 194 may be further shared with other entities such as the mobile device 128 via the wireless connection 130 and with the fleet vehicle 186 via the V2V connection 188. Additionally, the vehicle 102 may download the geofence 194 created by the fleet vehicle 186 from the server 178 or via the V2V connection 188.

Figure 2:
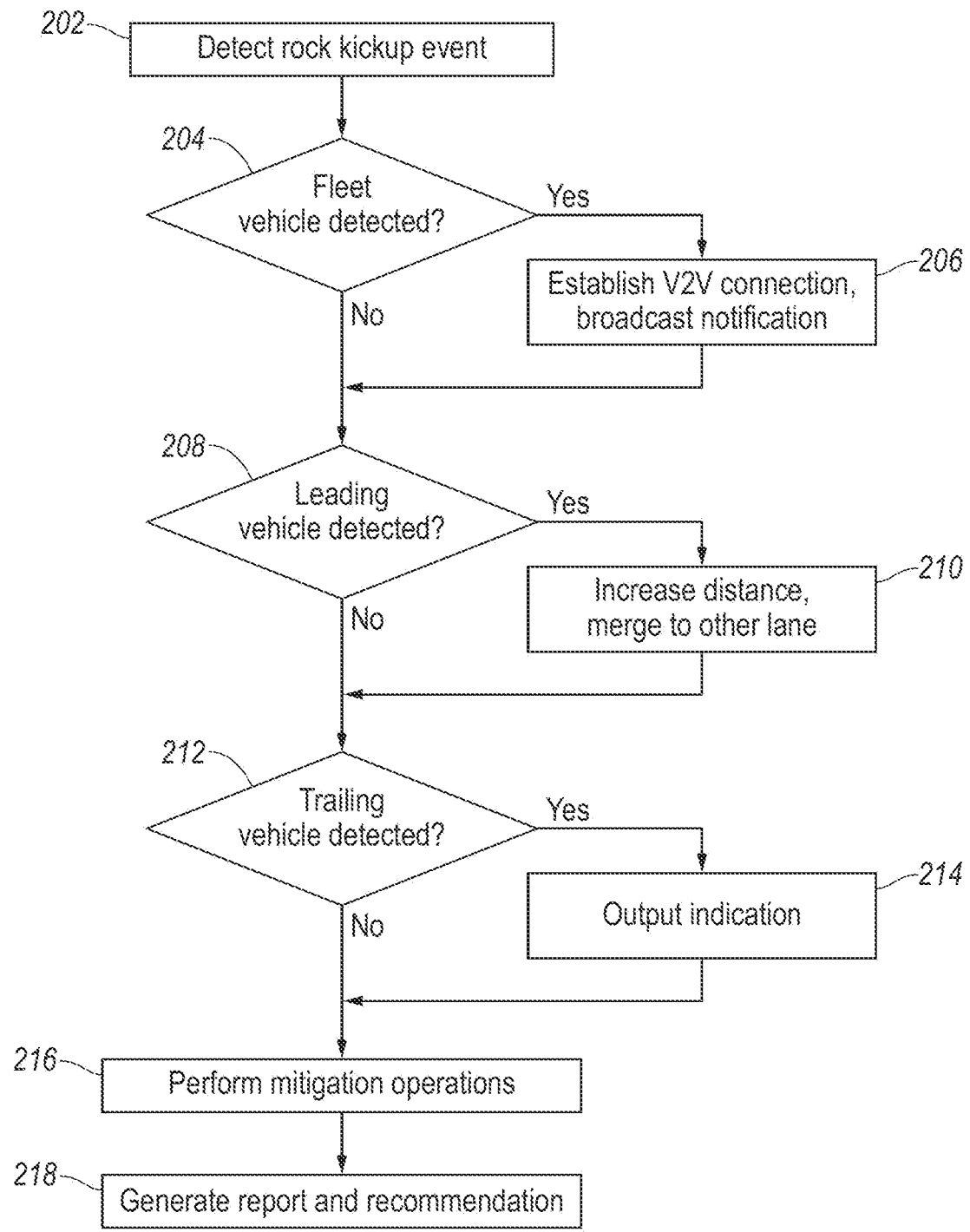
FIG. 2 illustrates an example flow diagram of a process for detecting and responding to rock kickups of one embodiment of the present disclosure.

Referring to FIG. 2, an example flow diagram of a process 200 for detecting and responding to vehicle rock kickups of one embodiment of the present disclosure is illustrated. With continuing reference to FIG. 1, the process 200 may be individually and/or collectively implemented via the computing platform 104 and one or more ECUs 168. For simplicity, the following description will be made primarily with reference to the computing platform 104. At operation 202, the computing platform 104 detects a rock kickup event indicative of rocks on the road are being kicked up by the vehicle 102 and/or other vehicles within the vicinity of the vehicle 102. There are a variety of methods for the computing platform 104 to detect the rock kickups. As discussed above, the computing platform 104 may rely on data received from the sensors 192, the camera 117 and/or the microphone 121 to perform the detection. Additionally or alternatively, the computing platform 104 may detect or assume the rock kickup event once the vehicle 102 has entered an area indicated in the geofence 194 based on the location data from the GNSS controller 124. Additionally or alternatively, the computing platform 104 may predict the rock kickup event using the sensor data indicative of the presence of the rock on the ground in front of the route to be traversed by the vehicle 102. For instance, the vehicle 102 may define a density threshold indicative of a likelihood that a rock kickup event will occur. Responsive to detecting rocks on the ground with a density (e.g. a quantity of rocks in a given area) above the predefined density threshold, the computing platform 104 may predict the occurrence of a rock kickup event and perform the corresponding operations.

In response, at operation 204, the computing platform 104 verifies if any fleet vehicle 186 within the vicinity of the vehicle 102 within or near the same geofence 194 is detected. The verification may be performed in various manners. For instance, a fleet vehicle 186 may be provided with a compatible transceiver transmitting a detectable beacon signal including identification information to entities nearby.

If the computing platform 104 detects the nearby fleet vehicle 186, the process proceeds to operation 206 and the vehicle 102 establish the V2V connection 188 with the fleet vehicle 186 and sends out a notification indicative of the rock kickup event and the corresponding location to the fleet vehicle 186 via the V2V connection 188. The notification may help the fleet vehicle 186 prepare to enter and traverse the area associated with the rock kickup event. For instance, responsive to receiving the notification, the fleet vehicle 186 may reduce vehicle speed upon arriving at the area associated with the rock kickup event. In the case that the fleet vehicle 186 is immediately trailing behind (i.e. no other vehicle is in between), the notification may help the fleet vehicle 186 increase the trailing distance from the vehicle 102. Additionally or alternatively, the vehicle 102 may broadcast the notification in an attempt to inform all vehicles within the wireless transmission range regardless whether those vehicles have been detected and classified as fleet vehicles 186. In some situations, although a nearby vehicle is configured to support the wireless transmission from the vehicle 102, the computing platform 104 may be unable to immediately identify the nearby vehicle as one of the fleet vehicles 186. The message broadcasting may be useful in these situations to facilitate the message to be delivered to all nearby vehicles in support of the wireless communication protocols.

After the notification has been sent and/or broadcast, or if the answer for operation 204 is no, the process proceeds to operation 208 and the vehicle 102 verifies if a leading vehicle is involved in the rock kickup event. The leading vehicle may be or may not be the fleet vehicle 186 configured to perform the V2V communication with the vehicle 102. As discussed above, the rock kickups may be caused by the vehicle 102 itself and/or by other vehicles nearby. If the rocks are kicked up by the vehicle 102 itself, the rocks are more likely to hit the undercarriage and sidemirrors of the vehicle 102. Otherwise, if the rocks are kicked up by a leading vehicle driving ahead of the vehicle 102, the rocks are more likely to hit the front grill, lights, and windshield of the vehicle 102 which is more undesirable in general. Due to the different vehicle locations where the rocks hit, the vehicle 102 may perform different operations in response. The computing platform 104 may detect the leading vehicle using sensor data and camera data indicative the presence of the leading vehicle within a predefined distance from the vehicle 102 within which the small rocks are likely to hit (e.g. within ten meters). Additionally or alternatively, the computing platform 104 may assume/detect the presence of the leading vehicle using sound data indicative of the front portion of the vehicle 102 are being hit by a small rock captured by the microphone 121 (e.g. low pitch sound).

If the answer for operation 208 is yes indicative of a leading vehicle presently being involved in the rock kickup event, the process proceeds to operation 210 and the computing platform 104 performs operations to mitigate the leading vehicle rock kickups. For instance, the computing platform 104 may output a message via the HMI controls 112 to ask the driver to perform recommended driving maneuvers such as increasing the following distance from the leading vehicle. The target following distance may be dynamically adjusted depending on various factors such as the density of the rocks, the speed of the leading vehicle or the like. In general, the denser rock kickups and higher vehicle speed may result in a higher target following distance. Thus, if the rock density or the speed of the leading vehicle increases, the computing platform 104 may further adjust and increase the target following distance. If the ADC 182 is enabled, the vehicle 102 may automatically perform the driving maneuvers such as slowing down and adopt the target following distance in addition to or in lieu of the outputting the message. Although the following distance has been increased, the ADC 182 may still operate the vehicle 102 at the same speed as the leading vehicle as long as the target following distance is outside the range of the rock kickups. The recommended driving maneuvers may include various options. For instance, the recommended driving maneuver may include merging to another lane (if available) that is different from the lane on which the leading vehicle is driving to reduce the chance of being hit by the rocks kicked up by the leading vehicle. Additionally or alternatively, the recommended driving maneuvers may include increase the vehicle speed and overtake the leading vehicle when appropriate (e.g. the leading vehicle is operating below the speed limit).

After the recommended driving maneuver to address the leading vehicle rock kickups has been output/performed or if the answer for operation 208 is no, the process proceeds to operation 212 and the computing platform 104 verifies if any trailing vehicles/automobiles driving behind the vehicle 102 within a short distance (e.g. ten meters) that may be hit by rocks kicked up by the tire of the vehicle 102 is present. If a trailing vehicle is within the short distance behind the vehicle 102, rocks may hit the trailing vehicle and cause undesirable paints chips and cracks. The computing platform 104 may detect the trailing vehicle using sensor data and/or camera data. If the answer for operation 212 is yes, the process proceeds to operation 214 and the computing platform 104 performs operations to notify the trailing vehicle to stay farther behind. If the trailing vehicle is one of the fleet vehicle 186, the computing platform 104 may send the recommendation via the V2V connection 188. As discussed above, not all nearby vehicles are fleet vehicles 186 configured to support V2V communications. If the trailing vehicle does not support the V2V communication (i.e. not one of the fleet vehicles 186), the vehicle 102 may output the notification using vehicle light (e.g. flashing blinker lights, flashing brake lights) to attract the awareness of the trailing vehicle driver such that the trailing vehicle may slow down.

After the notification has been sent/output to the trailing vehicle or if the answer for operation 212 is no, the process proceeds to operation 216 and the vehicle 102 performs mitigation operations to reduce the effect of the rock kickup event. While the driving maneuvers recommended and/or performed at operation 206 is directed to mitigate the effect of the rock kickup by the leading vehicle, the mitigating operations performed at operation 216 is more focused on reducing the effect of the rocks kicked up by the own tires of the vehicle 102. The mitigating operations may include various maneuvers performed by various components of the vehicle 102. For instance, the vehicle 102 may automatically switch to the economic driving mode to increase the involvement of the traction control via the PCM 180. The increased sensitivity of the traction control may reduce tire slippage by withdrawing power to wheels that begin to slip, thus reducing the possibility that rocks would be kicked up. Additionally or alternatively, the vehicle 102 may roll up all windows (if open) to reduce the chance any rocks entering into the vehicle cabin. Additionally or alternatively, the computing platform 104 may output a message via the HMI controls 112 to inform the vehicle driver about the rock kickups and recommend the driver to reduce vehicle speed. In the case that the ADC 182 is enabled, the ADC 182 may autonomously operate the vehicle 102 to reduce the driving speed to minimize the effect of the rocks hitting the undercarriage of the vehicle 102.

At operation 218, the computing platform 104 generates a report indicative of the rock kickup event and sends the report to the server 178 for event recordation. The report may include the geofence 194 corresponding to the rock kickup event having the starting location and the ending location. As discussed above, the geofence 194 may be shared with other fleet vehicles 186 such that the fleet vehicles 186 will be more prepared when driving in the geofenced area.

The report may further include an indicator reflecting whether the presence of the rock in the geofence is intended or unintended. For instance, road crews may intentionally put gravels and small rocks on unpaved road to fill the gaps and make the roads more even. Therefore, the presence of rock is intended and thus the rock kickup events are expected on these road sections within the geofence 194. In contrast, an excessive amount of loose gravels and small rocks on paved road sections may indicate poor road condition and unintentional spillovers (e.g. from a construction truck). The computing platform 104 may determine the indicator using sensor data and camera data to categorize the intentionality of the presence of the rocks. If the presence of the rocks is unintended, the computing platform 104 may further communicate the report to a corresponding entity (e.g. road crew) to recommend a repair or clean up.

The computing platform 104 may further generate recommendations for the user of the vehicle 102 to better prepare for future rock kickup events. As an example, responsive to repeating occurrences of the rock kickup events, the computing platform 104 may recommend installing protective devices such as mudflaps to the vehicle 102. The recommendation may be output via the HMI controls 112 of the computing platform 104. Additionally or alternatively, the recommendation may be sent to the mobile device 128 via the wireless connection 130. The computing platform 104 may be further configured to recommend different types and duty level of mudflaps depending on various factors such as the sizes of the rocks involved in the kickup events. For instance, responsive to detecting the rocks involved in the kickup events are smaller than a size threshold (e.g. based on the sensor data, camera data, and microphone data), the computing platform 104 may recommend light duty mudflaps. However, responsive to detecting a number of rocks involved in the kickup events are larger than the size threshold, the computing platform 104 may recommend heavy duty mudflaps instead. The recommendation may further include one or more alternative routes to detour from the locations where the rock kickup events are detected such that future rock kickup probabilities are reduced. The alternative routes may be calculated using the navigation controller 122 with the locations of the rock kickup events flagged as undesirable locations.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. The words processor and processors may be interchanged herein, as may the words controller and controllers.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle, comprising:
    one or more sensors configured to generate sensor data; and
    a controller programmed to:
        responsive to receiving the sensor data indicative of rocks being propelled off the ground, perform a vehicle operation to protect the vehicle from the propelled rocks.

2. The vehicle of claim 1, wherein the vehicle operation to protect the vehicle from the propelled rocks includes one or more of: reducing a vehicle speed, merging to another lane, limiting a wheel slip or closing a vehicle window.

3. The vehicle of claim 1, wherein the controller is further programmed to:
    responsive to receiving the sensor data indicative of the rocks being propelled by a leading automobile driving a distance ahead of the vehicle, perform the vehicle operation to increase the distance.

4. The vehicle of claim 3, wherein the one or more sensors include a microphone, and the controller is further programmed to:
    detect presence of the leading automobile using a frequency of sound caused by the rocks touching the vehicle detected by the microphone.

5. The vehicle of claim 1, further include a transceiver configured to communicate with a fleet automobile, the controller is further programmed to:
    send a notification indicative of the rocks being propelled to the fleet automobile via the transceiver.

6. The vehicle of claim 5, wherein the controller is further programmed to:
    responsive to detecting that the fleet automobile is immediately trailing behind the vehicle at a following distance, include, in the notification, a recommendation for the fleet automobile to increase the following distance.

7. The vehicle of claim 1, wherein the controller is further programmed to:
    responsive to detecting a trailing automobile is driving behind the vehicle, operate a light of the vehicle to attract awareness of the trailing automobile.

8. The vehicle of claim 1, wherein the controller is further programmed to:
    measure sizes of the rocks via the sensor data; and
    provide a mudflap installation recommendation, including a duty level of a mudflap determined using the sizes of the rocks.

9. A method for a vehicle, comprising:
    responsive to detecting a leading automobile driving ahead of the vehicle at a first distance is propelling rocks by tires, outputting a recommendation to a vehicle user to increase the first distance to protect the vehicle from the propelled rocks.

10. The method of claim 9, further comprising:
    autonomously performing driving maneuvers to increase the first distance.

11. The method of claim 10, further comprising:
    autonomously performing driving maneuvers to drive the vehicle at substantially the same speed as the leading automobile.

12. The method of claim 9, further comprising:
    autonomously performing driving maneuvers to increase the first distance to a target distance calculated by a density of the rocks and a speed of the leading automobile.

13. The method of claim 9, further comprising:
    responsive to detecting the leading automobile is propelling rocks while driving on a paved road, sending a request for cleaning the road to an entity.

14. The method of claim 9, further comprising:
    outputting the recommendation to increase a speed of the vehicle and pass the leading automobile.

15. A non-transitory computer-readable medium comprising instruction, when executed by one or more controllers of a vehicle, cause the vehicle to:
    detect, via one or more sensors, presence of rocks on a route to be traversed by the vehicle, wherein the rocks are associated with a density above a threshold indicative of an increased likelihood of being propelled by tires of the vehicle; and
    in response to the presence, perform a vehicle operation to protect the vehicle from the rocks, the vehicle operation including reducing a speed of the vehicle.

16. The non-transitory computer-readable medium of claim 15, further comprising instructions, when executed by the one or more controllers of the vehicle, cause the vehicle to:
    broadcast a notification indicative of the presence of rocks on the route via a wireless transceiver.

17. The non-transitory computer-readable medium of claim 15, further comprising instructions, when executed by the one or more controllers of the vehicle, cause the vehicle to:
    responsive to detecting a fleet automobile is at a vicinity of the vehicle, establish a wireless connection with the fleet automobile via a wireless transceiver; and
    send a notification indicative of the presence of rocks on the route to the fleet automobile via the wireless connection.

18. The non-transitory computer-readable medium of claim 15, further comprising instructions, when executed by the one or more controllers of the vehicle, cause the vehicle to:
    responsive to detecting a trailing automobile is driving immediately behind the vehicle via the one or more sensors, perform the vehicle operation to operate a light of the vehicle to attract awareness of the trailing automobile.

19. The non-transitory computer-readable medium of claim 15, further comprising instructions, when executed by the one or more controllers of the vehicle, cause the vehicle to:
    measure sizes of the rocks using the one or more sensors; and
    provide a recommendation to install mudflaps based on the sizes of the rocks.

20. The non-transitory computer-readable medium of claim 15, further comprising instructions, when executed by the one or more controllers of the vehicle, cause the vehicle to:

responsive to the presence of rocks on the route occurs on a paved road, send a request for cleaning the road to an entity.

* * * * *